United States Patent [19]

Pettigrew et al.

[11] Patent Number: 4,960,651
[45] Date of Patent: Oct. 2, 1990

[54] MAGNETIC DEVICES

[75] Inventors: Robert M. Pettigrew, Foxton; Stephen H. Chambers, Willingham; Dafydd G. Davies, Cambridge, all of United Kingdom

[73] Assignee: Scientific Generics Limited, King's Court, United Kingdom

[21] Appl. No.: 203,123

[22] Filed: Jun. 7, 1988

[30] Foreign Application Priority Data

Jun. 8, 1987 [GB] United Kingdom ............... 8713353
Dec. 29, 1987 [GB] United Kingdom ............... 8730237
May 26, 1988 [GB] United Kingdom ............... 8812500

[51] Int. Cl.$^5$ ............................................. G08B 13/26
[52] U.S. Cl. ................................. 428/607; 428/611;
428/622; 428/626; 428/650; 428/651; 428/679;
340/551; 340/572
[58] Field of Search ............... 428/607, 611, 622, 626,
428/632, 650, 651, 679; 340/551, 572; 335/296;
206/309, 387, 807

[56] References Cited

U.S. PATENT DOCUMENTS

| | | | |
|---|---|---|---|
| 3,938,125 | 2/1976 | Benassi | 428/686 |
| 4,484,184 | 11/1984 | Gregor et al. | 340/551 |
| 4,495,487 | 1/1985 | Kavesh et al. | 340/551 |
| 4,622,543 | 11/1986 | Anderson, III et al. | 340/572 |
| 4,636,448 | 1/1987 | Morita et al. | 428/607 |
| 4,673,612 | 6/1987 | Takagi et al. | 428/611 |
| 4,686,154 | 8/1987 | Mejia | 428/611 |

FOREIGN PATENT DOCUMENTS

| | | | |
|---|---|---|---|
| 1196986 | 11/1985 | Canada | 340/572 |
| 123557 | 10/1984 | European Pat. Off. | 340/572 |

*Primary Examiner*—Theodore Morris
*Assistant Examiner*—George Wyszomierski
*Attorney, Agent, or Firm*—Sixbey, Friedman, Leedom & Ferguson

[57] ABSTRACT

Magnetic devices are disclosed which include an article comprising a substrate and a thin coating of a magnetic material, in which:

(a) said substrate is a flexible, laminar material; (b) said magnetic material is an amorphous metal glass of high intrinsic magnetic permeability, with low or substantially zero magnetostriction, and with low coercivity; and (c) said thin coating of a magnetic material is not greater than 6 microns in thickness. This article can be used as, or to make, an antipilferage tag or marker. Deactivation materials and configurations are also disclosed, as well as techniques, in particular sputtering or PVD, for producing such a tag.

57 Claims, 4 Drawing Sheets

Fig. 3. FLOW CHART FOR ONE METHOD OF THIN FILM TAG PRODUCTION

MAGNETIC DEVICES

The invention relates to the magnetic devices, and in particular to thin film amorphous magnetic materials, to antipilferage tags or markers utilising such thin film materials, and to the production of such materials and articles.

Antipilferage tags or markers are applied to articles of commerce in order to protect them from theft at the point of sale premises. Typically, the tag is a magnetic medium which is deactivated when a shop assistant carries out the routine procedure at the time of effecting a sale. Deactivation is usually effected by applying a magnetic field to the tag which itself includes a deactivation layer, generally in the form of a magnetically semi-hard material with a high coercive force, located close to the active element in the tag. The semi-hard deactivating layer can be magnetised by a strong magnetic field and as a result the magnetised deactivating layer prevents the magnetically soft active layer from responding when subjected to an alternating magnetic field. Such deactivation prevents detection of the magnetic tag when it (and the article to which it is attached) pass through a detection system, typically in the form of a walk-through framework which emits an alternating magnetic interrogation field. This field is designed to interact with a tag which has not not been subjected to the routine deactivation procedure and to respond by, for example, trigerring a warning signal in the event that detection of a non-deactivated tag occurs.

Typically, antipilferage tags are elongate strips of a magnetically soft material, forming an active component, which may be carried by a suitable substrate. Such magnetic tags need to have carefully optimised magnetic properties. The magnetic material for such tags should possess a high intrinsic permeability. It is desirable that the material additionally have low or zero magnetostriction and low coercivity. A high permeability is usually, but not necessarily, associated with a low coercivity. The tags must be easy to apply to an article of merchandise, easy to produce and capable of producing a response in the intended detection system regardless of the orientation of the tag with respect to the detection system itself. Ideally, the magnetic material from which the deactivation layer is formed should have a square hysteresis loop and display high relative permeability. Not all of these criteria are satisfied by currently available tags.

Currently, antipilferage tags are produced in amorphous form by melt-spinning. This technique produces ribbons with practical minimum thickness of about 25 microns. An example of such a tag is described in US RE No. 32427.

With the known, thick markers additional elements of shape or material are often used, attached to the main magnetically nonlinear marker, to act as flux concentrators (to increase the sensitivity of the marker to the interrogation field). In particular, a flux concentrator is often placed at the end of a long bar-type marker.

Current systems exploit the nonlinear magnetic properties of various types of generally magnetically soft ferromagnetic materials in a time-varying interrogating magnetic field. Frequency or waveform components in the magnetic response of the material which are not contained in the interrogating field waveform are detected to identify the presence of a magnetic marker in the interrogation zone.

The shape of the material making up the active element of the magnetic marker stronger affects the magnetization response to an external magnetic field, because of the demagnetization factor N, which is dependent on the shape. Known markers take the form of amorphous metal ribbon ferromagnets which are formed by melt-spinning or similar techniques. These films are relatively thick, generally over 10 microns and often about 25 microns in thickness.

The demagnetizing field $\Delta H$ is equal to the product of the demagnetization factor N and the intensity of magnetization M.

The effective permeablity ($\mu_e$) of the tag can be derived approximately by the following formula:

$$\frac{1}{\mu_e} = \frac{1}{\mu_i} + N$$

where $\mu_i$ is the intrinsic permeability of the magnetic coating, and N is the demagnetisation factor; this (N) can be calculated as a function of the shape of the article. The inverse of the demagnetisation factor can be termed the shape factor (1/N).

The effective permeablity of the active component of a tag thus depends not only on the intrinsic permeability of the material of which it is formed, but also on its shape. The lower the demagnetisation factor, the closer is the effective permeability to the intrinsic permeability. Low demagnetisation factors are also desirable since they permit a lower intensity interrogation field to be used.

Known markers, to achieve low demagnetization factors, have to be quite long (usually a few cm.). We have discovered that very low demagnetization factors (preferably as small as the inverse of the relative permeability $\mu_i$, of the material) can be achieved by utilising thin films to form the markers, and lead to the following advantages:

(a) lower interrogation field (H) required for magnetic saturation—hence greater sensitivity; and (b) improved nonlinear behaviour, because of the advantageous effect on the response curve (M-H curve) of decreasing the demagnetization factor N.

According to one aspect of the invention there is provided an article comprising a substrate and a thin coated of a magnetic material, characterized in that:

(a) said substrate is a flexible, laminar material; (b) said magnetic material is an amorphous metal glass of high intrinsic magnetic permeability, with low or substantially zero magnetostriction, and with low coercivity; and (c) said thin coating of a magnetic material is not greater than 6 microns in thickness.

According to a second aspect of the invention there is provided an antipilferage tag or marker comprising a substrate and a thin coating of a magnetic material, characterised in that:

(a) said substrate is a flexible, laminar material; (b) said magnetic material is an amorphous metal glass of high intrinsic magnetic permeability and with low or substantially zero magnetostriction; and (c) said thin coating of a magnetic material is not greater than 6 microns in thickness.

Preferably, said thin coating is from 1 to 5 microns in thickness.

With such a thin coating, the possibility of producing tags of more convenient shapes is achieved. In particular, a tag having the dimensions and shape of a normal price label can be utilised. This has the advantage that known application techniques can be used to apply the tags without the need for special equipment.

In one embodiment, the substrate is a flexible, laminar material having a primary axis defining the major dimension of the substrate and a real or notional secondary axis perpendicular to said primary axis and located so as to pass through the mid point of said primary axis, the ratio between the dimensions of said substrate measured along said primary axis and said secondary axis being not greater than 3:1.

Thin film markers are more mechanically flexible and hence more robust than the known thick ones, and they do not suffer appreciably from inefficiency introduced by the electromagnetic skin effect (which can affect thick markers at high frequencies).

Preferably, the thin coating is substantially coterminous with the substrate. In one form, it covers substantially all of the substrate. This can be achieved by depositing the material by physical vapour deposition techniques, described hereinafter. In another form, the thin coating is formed to be self supporting, e.g. by rolling. The thin coating in both forms is preferably uniform in thickness.

The coating may take the form of a lattice the parts of which are substantially uniform in thickness.

Generally, the thin coating will be bonded directly to, or deposited on, the substrate; in some embodiments, however, there is an intermediate layer between the thin coating and the substrate.

A particular problem with known tags is that they are orientation-sensitive—that is, their output in detection gates is dependent on the orientation of the tag. The shapes of the tags according to preferred embodiments of the invention ameliorate this problem. The problem is further reduced according to a further preferred feature of the invention whereby the thin coating has magnetic properties which are isotropic in the plane of the substrate.

Thin film markers in general need not be as long as currently available strip markers, making them less conspicuous and cheaper than the known markers. This leads to a further advantage that the length/width ratio can be made as low as 1 (this is desirable so as to increase the volume of the material and hence the received signal). In particular, square or circular markers (or ones of similarly squat aspect) have the advantage, hitherto unrecognised, that they are very sensitive in virtually any orientation—in fact maximally sensitive (or very nearly so) in any orientation in an interrogating field lying in two or more mutually orthogonal directions.

In one embodiment of the present invention, the thin film is configured as a broken or discontinuous flat loop of ferromagnetic material. Such a configuration functions both as a marker an to concentrate the flux, thereby to increase the sensitivity of the marker to the interrogation field. Preferably the marker is a circular annulus of nonlinear ferromagnetic material. This gives the advantage of orientation versatility, since the flux concentration will be achieved for any component of applied field lying in the plane of the loop. The breaks or discontinuities in the loop are necessary to ensure the generation of free magnetic dipoles which, when the tag or marker is in use, can radiate the detected signal. Such a marker can be formed by the methods disclosed herein.

It has been found by the present inventors that magnetic isotropy in the plane of the substrate is desirable and can be much improved by controlling conditions governing physical vapour deposition techniques such that the atomic growth structure is almost entirely perpendicular to the substrate surface.

The deposition technique can be sputtering, e.g. planar magnetron sputtering, electron beam or thermal evaporation (enabling a faster deposition rate but achieving a less dense product) or electrolysis. Another technique is organometallic vapour pyrolysis. Further possibilities include: laser driven physcial vapour deposition in which a laser beam is scanned over a target surface to ablate the material to be deposited; and deposition from a liquid using a chemical technique.

In planar magnetron sputtering, a magnetron generates an annular ring of flux so that sputtering is carried out in a magnetic field where lines of force are perpendicular to the substrate, which is carried by a rotating drum. Ferromagnetic atoms in the sputtered composition tend to "line up" along these lines of force hence giving rise to some order on an atomic scale. The effect of this order on the isotropic behaviour of the material depends on the position of the drum carrying the substrate, since this affects the angle between the magnetic lines of force and the substrate. We have found that the application of a strong magnetic field to oppose the obtaining magnetic field may beneficially affect the isotropy of the finished product. Also, replacement of the drum by a flat substrate (to reduce the angle effect discussed above) may be beneficial. A further arrangement is to screen part of the drum from the magnetic field in an attempt to avoid build up of the ferromagnetic atoms causing anisotropic behaviour over the whole surface of the drum. In this way the effect of any build up can be reduced.

Improvements in isotropy can also be achieved if the magnetic material is deposited onto a suitable synthetic polymeric substrate, e.g. a polyester, polyamide or polymide. It is important that the substrate surface is clean and smooth, this serving to reduce both oxidation contamination and opportunities for domain wall pinning. Metal foil e.g. aluminium foil may be used, either as substrate or as an intermediate layer, but usually is less satisfactory because of inadequate surface smoothness. If the substrate is a plastics polymer coated with a layer of aluminium, this assists in conducting heat away from the substrate during deposition. One particularly suitable polymer for use as the substrate is a cast polyimide, 'Upilex', from ICI.

The magnetic qualities of the amorphous magnetic film may in certain cases be enhanced by an annealing cycle after deposition of the thin film—this being referred to in general as 'post annealing'. The deposition process conditions determine the amount of unwanted impurities, the crystallographic pinning centres, and the surface roughness of the film; post annealing generally improves all of these parameters and gives a more homogeneous product with increased intrinsic permeability and improved isotropy. For example, the thin film may be deposited onto 'Upilex', which has the advantage of being heat resistant allowing several hours post annealing of the film at 250° C. to improve the qualities described above and thus to maximise the signal output if desired. The conditions under which post annealing is used will be adapted in any particular case to take account of the properties of the substrate.

The ideal thickness for a sputtered film is probably 1 micron; below 500 nm, surface pinning effects become dominant and the signal obtained from the tag in an interrogation gate is poor. For a label with dimensions of about 3 cm by 2 cm, a thickness of 3 microns is theoretically better, but may be too expensive to achieve economically by sputtering. Thicknesses greater than 3 microns are not preferred, since bulk effects predominate and the demagnetisation factor becomes too great.

As mentioned above, improved signal and isotropy can be achieved by annealing the film. Such annealing, however, must take place below the crystallisation temperature of the magnetic film—typically this is around 500° C. Polyesters such as 'Melinex' tend to be difficult to anneal because of low heat resistance; polyamides and polyimides such as 'Upilex' or 'Kapton' are better in this regard, but more expensive.

A further technique which may be beneficial is the injection of a plasma during sputtering. This in effect gives deposition and annealing simultaneously. Energy is injected by the plasma into the growing magnetic film, which results in atomic annealing.

The magnetic material deposited may be a mixture of metals with a suitable glass-forming element or elements. Compositions typical of those currently used to form melt-spun magnetic metallic glasses are suitable. One such composition is Co-Nb, with a suitable glass forming element. Other suitable amorphos alloys include the transition metal/metalloid (T-M) and transition metal/transition metal (T-T) alloys. Typical metalloids in this context are boron, carbon, silicon, phosphorus and germanium, which may form about 15–30% of the alloy. T-T alloys contain late transition metals such as Fe, Co, Ni or early transition metals such as Zr and Hf and have good thermal stability. The composition of T-M type alloys amenable to solification to an amorphous phase is typically around $T_{80} M_{20}$, e.g. $Fe_{80} B_{20}$. By adding Co and Ni to Fe-B systems, an increase in Curie temperature results, with an increase in saturation magnetic induction. The addition of other metalloids also has an effect on material properties such as saturation magnetic induction, Curie temperature, anisotropy, magnetisation and coercivity. The most appropriate alloy for any particular application can be selected through considertion of the desired properties.

The amorphous ferromagnetic alloy used as the active layer (i.e. the thin coating over the substrate) preferably possesses a coercivity ($H_c$) that approaches zero, an intrinsic permeability of greater than $10^4$, minimal magnetostriction and low magnetic crystalline anisotropy (K). These properties are determined by both the composition of the alloy and the deposition technique and conditions.

The preferred alloys are combinations of elements, generally of metal and metalloid elements, which, when combined in the correct atomic percentages, give an amorphous structure under the right deposition conditions. Many such alloys contain Co, Fe, Si and B. Ni may be also be present. Suitable alloys are amorphous metal glasses, for example: $Co_a Fe_b Ni_c Mo_d Si_e B_f$, where a is in the range of 35 to 70 atomic percent, b zero to 8 atomic percent, c zero to 40 atomic percent, d zero to four atomic percent, e zero to thirty atomic percent and f zero to thirty atomic percent, with at least one of groups b, c, d and e, f being non zero. The inclusion of nickel is found to assist in increasing the ductability of the product, which facilitates its handling and usage. Suitable properties may also be achieved with alloys of iron, aluminium and silicon that are designed to have zero magnetostriction. Magnetic properties of some alloys are very senitive to a change in their stoichimetric composition. Others are magnetostrictive and hence do not possess a sufficiently high permeability. The ratio Co:Fe markedly affects the magnetostrictive properties of the alloy; the atomic ratio Co:Fe is preferably in the range 8:1 to 20:1, more preferably about 16:1. A preferred range of composition (in atomic percent) is: Co, 35–70; Fe, 2–7; Ni 10–35; Mo, 0–2; Si, 12–20; and B, 6–12.

One satisfactory alloy is $Co_{66}Fe_4Mo_2Si_{16}B_{12}$, currently manufactured as Vitrovac 6025. Another is Vitrovac 6030 which contains manganese in place of molybdenum. A further and presently preferred alloy has the composition Co, 42; Fe, 4; Ni, 28; Si, 16; B, 9 atomic percent.

When using a substrate with a low softening or melting point, it may be advantageous for the substrate to be cooled during deposition to maintain a sufficient quench rate for the formation of the amorphous state, and to reduce thermal stresses in the substrate or film which can affect magnetic properties. Preferably, the temperature of the substrate during deposition is kept low—advantageously below 60° C., and better still below 20° C. and where practical (by suitable cooling techniques) at or below 0° C.

The substrate can be a continuous web or sheet of suitable material. This may be a polymer, e.g. a polyester, for example polyethylene terephthalate, a polyamide, or a polyimide, which leads to a flexible sheet product which can easily be stored and cut for subsequent use.

An antipilferage tag or marker of this invention will generally include a deactivation layer or zone(s) adjacent to or overlying said thin coating. This may take the form of a continuous layer of of a multiplicity of discrete elements.

The present invention also relates to deactivation techniques. Currently, security tags are deactivated by several different methods, the most common of which is to apply a fixed magnetic field to a semi-hard magnet portion of the tag to saturate the soft magnetic material of the tag and hence render it inoperative or to change the effective magnetic properties so that it is not recognised by the detection system. The semi-hard magnet portion is conventionally formed by one or more areas of semi-hard magnetic material secured to or integral with the tag. The material used as the deactivation material should not be a truly hard magnetic material, since the high coercivity of such materials would require the use of a high deactivation field, $h_D$, which could lead to interference with other, non-related magnetic media such as credit cards or pre-recorded audio tapes.

Deactivation techniques should be such as to secure complete deactivation of the active component of a tag when a fixed magnetic field is applied, and should occur almost regardless of the relative orientation between the tag and the fixed field.

The deactivating material may be fabricated by thin film processes (for example those referred to above for the thin film tags) or by spreading of a magnetic slurry onto a suitable substrate. The deactivating material may also be formed from a sheet of solid material reduced to an appropriate thickness by a process such as rolling, casting or extrusion. Such a sheet may be between 1 micron and 50 microns thickness, but is preferably in the range of 5 to 35 microns.

The deactivator may be in the form of a continuous sheet placed close to the active element. The deactivation process can, however, be made more efficient if the deactivator film or sheet is not continuous, but broken into a multiplicity of discrete elements. Examples of suitable configurations are rectangular, circular or polygonal pieces of film or sheet 1 mm to 10 mm across, laid or fabricated in a pattern close to the active element; or a number of long straight strips laid in a grid or matrix of crossed grids, or a number of serpentine strips. The magnetic field patterns of these configurations are more effective in their deactivation function than a continuous film or sheet of deactivator of equivalent volume since the magnetic field which these non-continuous configurations produce in the active film lies in a number of directions, thus rendering it less prone to cancellation by a uniform external field.

Preferably the deactivation field should be high in comparison with the interrogation field used at the detection system. The deactivation field, $H_D$, is preferably 2000 A/m or greater; however, so as to avoid unwanted interference with other magnetic media, the value of $H_D$ should not exceed 10,000 A/m. This compares with the interrogation field which may be, for example, an alternating field of about 500 A/m. If a deactivated tag is taken through the interrogation gate close to the sides where the interrogation field is highest then the tag may be re-activated to a greater or lesser extent. This may, in some systems, generate a signal in the detection system which is a false positive. Different commercial systems use different interrogation field parameters and different detection techniques; for example, the alternating frequency may be a single component field or a multi-component field. The maximum frequency of the interrogation field is usually not more than a few tens of kHz, and is more often around 3–10 kHz. In one multi-component system, three frequencies of around 5 kHz, 3.3 kHz and 20 Hz are used. With this particular system, if the value of $H_D$ were significantly less than say 1000 A/m, and if the deactivated tag is taken through the interrogation gate close to the sides where the interrogation field is high, then although the tag may be re-activated to a greater or lesser extent, this will nevertheless produce a signal from the gate which can still be differential from that of a fully active tag: instead of giving an output signal when the 20 Hz interrogation field passes through zero, the signal will occur at transects through a positive field value. The generation of such a spurious signal need not be of undue concern with this particular system since a detection system can be designed to discriminate between signals which have a different time separation, as will be the case with a true response and a "false" response. Other, simpler systems, however, are unable to differentiate between 'true' and 'false' positives in this way and it is therefore desirable for the deactivation field always to be considerably greater than the interrogation field.

The following are proposed as deactivation regimes:

(1) the provision of a mild steel foil, of suitable thickness, secured to one surface of the tag to provide a permanent magnet when subjected to a fixed magnetic field;

(2) the provision of cold worked stainless steel foil or strips adjacent to or overlying the active amorphous material;

(3) the provision of a plurality of randomly oriented steel fibres arranged over the surface of the tag, spaced so as to cover an area of perhaps 10–20% or even up to 60%, of the total surface area—steel wool of a length commensurate with the tag, or 'needles', about 4—5 mm long, could be used. EN2 mild steel is suitable;

(4) the use of a thick film ferrite (iron oxide or mixed metal oxide) particles in a random orientation;

(5) roughening areas of the substrate of the tag, after deposition of the magnetic material, to give zones of a hard magnetic material; this can be used as the deactivation "layer". A similar effect may be achieved by post-etching the vapour deposited active magnetic layer or by crystallising the amorphous (active) film; and (6) the use of a series of discrete islands or strips of deactivating material.

In the case of (1), the aim is to maximise the field input from the deactivation layer to the soft active layer beneath it. The greater the volume of the deactivation layer, the more magnetic flux it can contain.

As the deactivating foil, mild steel (0.12% C.) of 25 micron thickness (as supplied) cold rolled down to a thickness of about 1–40 microns, typically around 5–15 microns, can be used. The finished foil can be annealed, although there is a need to retain some physical hardness since this is reflected in the magnetic hardness property of the material. The deactivation layer must be magnetically semi-hard, i.e. with a coercivity $H_C$ in the range 1,000–10,000 A/m. The cold working typically results in a 50–80% area reduction. The mild steel used in one embodiment is designated EN2 and has a coercive force of around 1200 A/m.

With regard to regime (2), we have found that certain stainless steels can in if suitably pre-treated be used to form the deactivating layer or region(s) in a magnetic antipilferage tag. Many stainless steels are wholly austenitic and paramagnetic at room temperature. However, a substantial amount of ferromagnetic martensite may be formed if the steel if severely cold worked, e.g. at room temperature. We have found that certain such steels have properties well suited to use as the deactivating material in an antipilferage tag.

According to one aspect of the present invention, there is provided an antipilferage tag or marker which includes a deactivating layer or region comprising a stainless steel which has been cold worked substantially to a hardened state, said steel being an alloy containing, in atomic percent, 15–20% chromium; 5–10% nickel; carbon up to 0.15%; and the balance iron together with incidental impurities and conventional stainless steel additives present up to a total of 4%. Typically, a suitable stainless steel will contain, in addition to the elements just listed, from 0.5–3% manganese; from 0.5–1.5% silicon; and small amounts of phosphorus and sulphur.

A commerically available stainless steel which satisfies the compositional criteria defined above is Type AISI 301 stainless steel. This contains up to 0.15% carbon; 2% manganese; 1% silicon; 0.045% phosphorus; 0.03% sulphur; 16–18% chromium; 6–8% nickel; and the balance iron. Cold working of such a steel to 50% reduction will produce a steel with sufficient coercivity for use as a deactivation material. Further cold working has relatively little effect on the magnetic properties of the material.

An antipilferage tag having as its deactivating material a zone of Type AISI 301 stainless steel cold worked to a hardened state and having dimensions of 8 mm × 3 mm × 50 microns has been found to work satisfactorily in commericially available antipilferage systems. Such a tag is considerably cheaper to produce than an otherwise equivalent tag containing a more exotic alloy including cobalt, nickel and titanium.

The provision, as in (3) and (4), of randomly orientated, relatively small, ferromagnetic elements, which act as permanent magnets in a fixed magnetic field, has the advantage that a plurality of pairs of alternate magnetic poles are imposed on the soft magnetic material of the tag. Also, these pairs are randomly oriented so that they can be magnetized by a magnetic field oriented in any direction relative to the tag.

The preferred ferrites are ferrous ferrites containing a small proportion of cobalt—the amount of Co is preferably adjusted to vary the coercivity ($H_c$) to the desired value. One suitable ferrite has the formula ($Co_{0.2}Fe^{2+}{}_{0.8}Fe^{3+}{}_2O_4$). The properties of such ferrites may be improved by magnetic annealing, i.e. annealing at a temperature above the Curie temperature ($T_c$) for the material concerned while in a static or alternatively magnetic field.

Tests have shown that deactivation with needles of 4 mm in length is more effective than with needles of 1 mm; this is because of the shape-dependent element of the demagnetisation factor. A coverage of some 60% can reduce the tendency of the gate reactivating a tag which has been inadequately deactivated. For both 'wool' and 'needles', the steel fibres can be 4–15 microns, preferably about 8 microns in diameter. Magnetic stainless steels would avoid the corrosion problem associated with mild steel foils. Beckhaert of Belgium produce a steel of Type AISI 430 which works satisfactorily. Needles formed of cold worked stainless steel Type AISI 301 (see above under (2)) also work well.

Pre-roughening of the substrate surface, as in (5), in selected regions may be of use in co-depositing the deactivation layer with the soft magnetic layer. Surface pinning to the rough areas of the substrate results in the deposition of a denser layer of film which has a higher coercive force; this physically harder material is thus harder magnetically as well.

A variation of this idea is to use post-etching to give a physically and magnetically harder zone which is intended to be the deactivation material.

The use of a series of discrete islands or strips of deactivating material as in (6) means that, when the deactivation field is applied, this gives rise to regions within the active layer of opposed magnetically clamped characteristics. The spacing between adjacent islands should perferably be relatively large to give an air gap of sufficient size to prevent magnetic flux flowing through air from a north pole on one island to the neighbouring south pole on the adjacent island. This system works effectively, even thoough parts of the tag will still respond to the interrogation field. The signal generated, however, is vastly reduced—to an extent much greater than the volume proportion of material which remains active. This is because the demagnetization factor of the active zone is shape-dependent, and is much greater for squat shapes than for elongate shapes. Consequently, the signal generated is insufficient to activate the alarm at the gate.

Considerations of shape and demagnetization factors can be applied to the deactivation means to make them more or less sensitive to magnetic fields (and hence to adjust the deactivation threshold) in particular directions. This will be of advantage in protecting the markers against accidental or unauthorised deactivation.

It may also be possible to use a lattice or network structure instead of islands of deactivator, although such an arrangement is less preferable since the lattice configuration is less effective than the island configuration in generating magnetic dipoles at free edges.

For securing any deactivation material to a tag, a suitable adhesive is required. In order to decrease the reluctance for flux passing from the deactivation material to the active layer beneath it, the thickness of adhesive ought to be as little as possible. One arrangement is to apply the needles magnetically, after which an adhesive can be coated onto the deposited needles. The end product could then be de-gaussed to eliminate permanent magnetism.

As mentioned previously, the soft, ferromagnetic amorphous metal glass thin film coating may be deposited by for example sputtering, electron beam evaporation or electroless or electrolytic chemical deposition. To achieve the desired magnetic properties, in particular low coercivity, for a sputtered film, the sputtering pressure is preferably between 0.1 and 1.0 pascals of argon, depending on the geometry of the coater and on the composition of the sputtered material. The lower the gas pressure, the denser the sputtered product since the mean free path for the sputtered atoms between target and substrate is reduced. Krypton is also possible for use as the gaseous atmosphere, giving rise to a denser sputtered product.

The substrate temperature should be as low as possible and preferably maintained at less than 60° C. to allow maximal deposition rate and to promote formation of an amorphous, unordered film.

Minimal anisotropy in the plane of the sputtered product is attained if the layers are deposited with an atomic structure perpendicular to the substrate and with "in plane" and angled atomic crystallographic planes kept to a minimum. With a magnetron sputtering technique, this can be achieved by utilising the part of the product directly below the magnetron and discarding peripheral portions where the growth structure may be angled to the substrate. This is in contrast to a conventional sputtering process for some magnetic storage applications where the product is deliberately produced with an angled crystalline growth structure.

This aspect can be further explained by considering the sputtering process on an atomic scale. Even though an amorphous film is to be deposited, there is nevertheless some grain structure which arises as a result of the different atomic sizes of the elements being deposited. Although the mechanism is not fully understood, it is believed that the larger atoms effectively shadow peripheral areas of the substrate, thereby causing a preferential build up of smaller atoms in the region immediately below the magnetron. The grain structure tends to define columns substantially perpendicular to the substrate in the region below the magnetron, whereas the atoms deposited outside that region adopt a structure angled with respect to the substrate. This also causes the thickness of the deposited film to be less outside that region.

Stress effects are significant. Typically, a 50–75 micron plastics film will not be flat, but will have a curvature which arises from its winding onto a roll. When the film is placed beneath the annular sputter target, it is stretched flat and this introduces stress into the film. When the coated sample is removed from the magnetron, the film tends to assume its former curved state, which then introduces stress into the magnetic coating. Low sputtering pressures give denser films, which have greater internal compression, but nevertheless tend to give an increased signal output. To overcome this the film could be deposited under tension so that no stress is induced into the magnetic layer when the is straightened out.

A sputtering-dependent anisotropy arises from the different angles of incidence on the film of the magnetic field generated by the magnetron, as explained earlier. We have found that, if a sample undergoing sputtering is rotated about its own central axis during the sputtering process, the result is that the anisotropy in the finished sample correlates with the magnetic field direction at the start of sputtering; the initially deposited material is effectively seeding the deposition of further material, thus retaining a "memory" of the initial magnetic conditions. This magnetic field related anisotropy might be overcome by mounting a permanent magnet below the drum which carries the samples.

The targets for sputtering of the active magnetic layer are preferably prepared by casting techniques. These are relatively inexpensive and give products with good homogeneity. Where said techniques are not practicable, the powdered material may be subjected to hot isostatic pressing (termed "HIPing"), to consolidate the powder into solid form.

Electron beam evaporated film is deposited from multiple sources, each crucible containing only one or possibly two elements if the vapour pressures were very similar.

The following formula relating the demagnetisation factor N to the dimensions of a magnetic material applies to ellipsoids of revolution, but is broadly applicable to shapes approximating to ellipsoids, such as the substantially rectangular tags shown in the Figure:

$$N = BC/A^2 \ln\left[\frac{4A}{B+C} - 1\right]$$

where A is the major axis, B is the minor axis and C is the thickness of the magnetic coating. The tag could be a true rectangle or an ellipsoid: the illustrated shape is chosen as being one preferred shape of price labels currently applied to articles, and can thus be applied by conventional label applicators. The table below sets out a comparison between the values of 1/N for tags of various configurations:

|  | A(mm) | B(mm) | C(μm) | 1/N |
|---|---|---|---|---|
| Known security tag | 33 | 0.5 | 25 | 19,200 |
| tag I | 30 | 19 | 1 | 56,000 |
| tag II | 30 | 19 | 3 | 18,700 |
| tag III | 30 | 19 | 5 | 11,000 |

From this it can readily be seen that the small thickness of the tags I, II, III of the invention enables a far more convenient tag shape to be adopted without significant degradation in the value of 1/N. Preferred embodiments of the invention hence provide a tag which has a ratio A:B of less than 3:1, and preferably in the range 1:1 to 3:1. The dimension A can lie between 10–60 mm and B between 4 and 45 mm.

If the above criteria only were to be taken into consideration, the optimum tag thickness would be 1 micron or even less. However, the strength of the signal output from the tag in the interrogation field depends on the cross-sectional area of the magnetic layer; the greater the cross sectional area, the stronger the signal. The selection of tag dimensions depends therefore on the relative importance of signal strength and high permeability. For a continuous magnetic layer, a thickness of between 3–4 microns for a tag of 30×19 mm is preferred. Such a tag can be formed by physical vapour deposition as discussed above.

The resulting product is a flexible sheet product which can be scrolled for storage and which can be easily cut to form security tags.

In cutting the tags to shape from a roll, it is advantageous to cut through the magnetic coating layers and the backing film, but not to cut the silicone paper base which conventionally is used to carry the other layers. To achieve this, the product may for example be placed on a surface which has a recess or a gap, and a cutting tool may be brought against the composite film just beyond the edge of the gap; this action will allow the paper to bend around the edge but the more brittle plastics and metallic layers will shear.

Preferably the finished tag has "anti-tamper" slits along its major sides. These slits make it very difficult to remove the complete tag from an article; any effort to remove the tag merely tears away part of the tag, thus making it clear at the point of sale that the tag has been tampered with.

In another embodiment, a tag can be formed by rolling an amorphous ferromagnetic alloy to a thickness of some 5–6 microns. This is believed to be the lowest practicable thickness achievable with known rolling techniques. The rolled alloy is then cut and secured to a suitable substrate. The signal strength of such a tag is high, but, according to the above analysis, the shape factor 1/N is unduly low. To reduce the demagnetisation factor (N) to an acceptable value, the magnetic material is preferably in the form of a lattice with cutout regions and parts of substantially uniform thickness between the cut out regions.

According to yet a further aspect of the present invention there is provided a magnetic marker, applied to or suitable for application to an article to be marked, comprising a plurality of acicular elements of magnetic material.

The acicular elements can be fine needle-shaped particles of nonlinear magnetic material, which could be easily incorporated into paper, or into a film attached to the article, or into some component of the article itself. While other ellipsoidal, spherical, or random shapes may be used to offer more isotropic sensitivity in other aspects of the invention, the needle shape has a low demagnetization factor N and hence is very sensitive to the interrogation field. The acicular elements may be about 200 microns long. They may be aligned or randomly oriented: the latter arrangement would give overall a more isotropic effect.

According to a further aspect of the present invention, there is provided an antipilferage tag or marker characterised in that it comprises a broken or discontinuous flat loop of ferromagnetic material. The flat loop of ferromagnetic material may be in the form of a circular annulus of magnetically non-linear ferromagnetic material.

According to a further aspect of the present invention, there is provided an article for use as an antipilferage marker, comprising: an active component of soft magnetic material adapted to generate a signal in an interrogation field applied by a detection system for detecting the article; and means for deactivating the active component so that said signal is not generated, or is generated only below a level detectable by the detection system, said deactivating means comprising a plurality of ferromagnetic elements carried by the active component, and each ferromagnetic element acquiring, in the presence of a deactivating magnetic field, north and south magnetic poles at opposite end regions thereof and the ferromagnetic elements being randomly oriented over the surface of the article. In this embodiment, the ferromagnetic elements may comprise steel wool fibres or ferrite particles.

According to a further aspect of the present invention, there is provided an article for use as an antipilferage marker, comprising: an active component of soft magnetic material adapted to generate a signal in an interrogation field applied by a detection system for detecting the article; and means for deactivating the active component so that said signal is not generated, or is generated only below a level detectable by the detection system, said deactivating means comprising a layer of mild steel secured to the active component.

BRIEF DESCRIPTION OF THE DRAWING

For a better understanding of the present invention, preferred embodiments will now be described by way of example and with reference to the accompanying drawings, in which.

Figure 1:
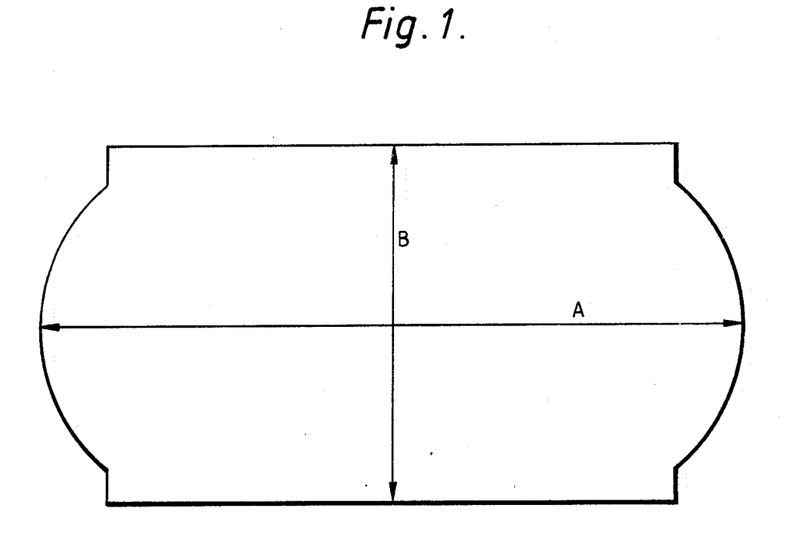
FIG. 1 shows an antipilferage tag of this invention.

Referring to FIG. 1, the tag is generally rectangular in shape, having a primary axis A and a secondary axis B. The ratio of the dimensions A:B is less than 3:1. As mentioned hereinbefore, the tag may have a variety of shapes and configurations, some of which are relatively squat, i.e. with the ratio A:B approaching or equalling 1:1. The tag may also be circular. The tag comprises a series of layers built up in a manner which will be described hereinafter. The principal active parts of the tag are a thin coating of an amorphous metal glass having the magnetic properties described hereinbefore, this being coated onto a polymeric substrate, and a deactivating layer or zone(s) of a semi-hard magnetic material whose magnetic properties are as described hereinbefore.

Figure 2:
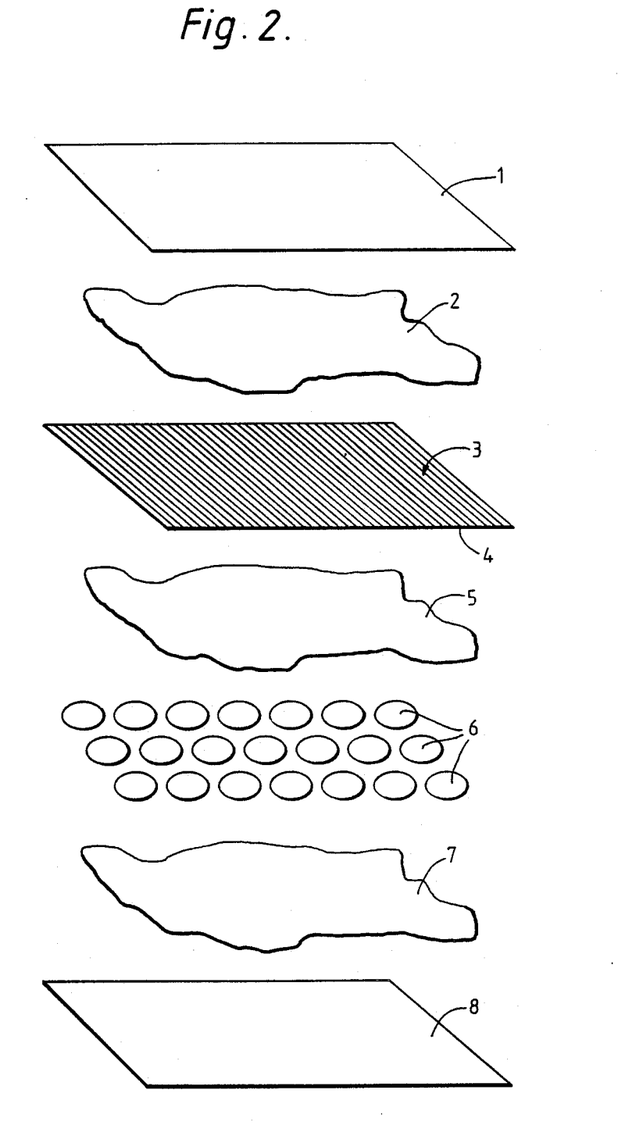
FIG. 2 shows an exploded axonometric view of the tag of FIG. 1.

Referring next to FIG. 2, the tag as produced has a paper face sheet 1 secured by a thin layer of adhesive 2 to a polymer substrate 4 carrying a thin film of an amorphous metal glass 3. Below the substrate as seen in FIG. 2 there is a zone of deactivating material 6 secured to the substrate 4 by another thin film of adhesive 5. A non-adhesive backing sheet 8 is secured by a further thin film of adhesive 7 to the deactivating elements 6.

Figure 4A:
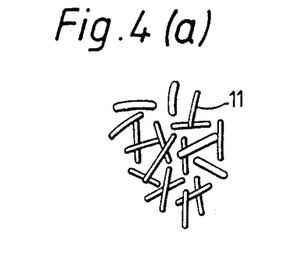
FIG. 4 illustrates schematically and not to scale three configurations of deactivating material.
Figure 4B:
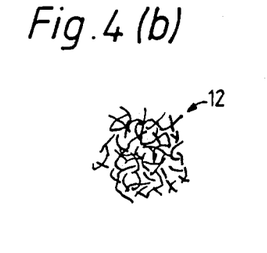
Figure 4C:
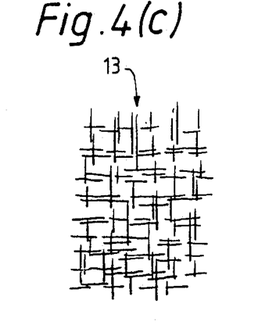

Referring next to FIG. 4, three configurations of deactivating material are shown. In FIG. 4(a), steel needles 11 are depicted. These needles may be formed from any magnetically non-linear material, and are preferably incorporated into paper or a film and may be as long as 4 mm in length (as set forth in Example 7 hereinafter) and as short as 200 microns. In FIG. 4(b), the deactivating material is in the form of steel wool 12. In the arrangement of FIG. 4(c), a grid or mesh 13 of overlapping steel needles or fibres is shown. Such configurations can replace the array of elements 6 shown in FIG. 2.

Figure 5:
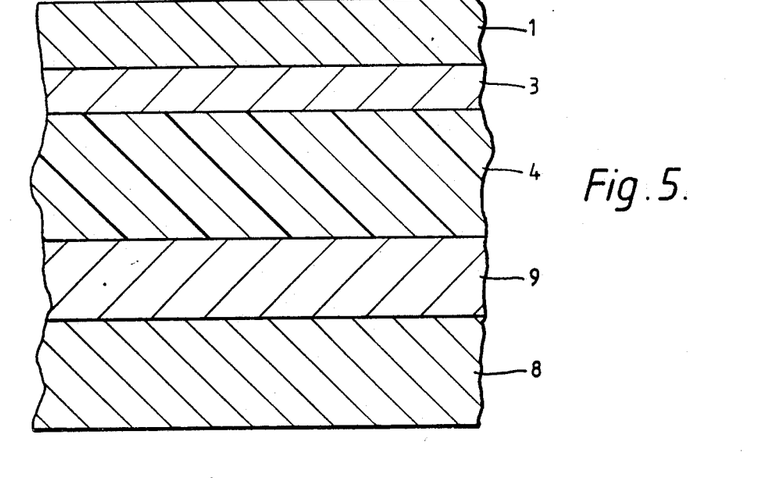
FIG. 5 shows a schematic, cross-sectional view of a tag similar to that of FIG. 2 except in the arrangement of its deactivating material.

FIG. 5 shows a schematic cross section through a tag; the same reference numerals as in FIG. 2 are used to denote identical components. In this embodiment, the deactivating material differs from that of FIG. 2; instead of an array 6, there is a layer 9 which may be a coating of a suspension of particles of a ferrite, a thin film of Type AISI 301 stainless steel, or a configuration such as shown in FIG. 4.

Figure 3:
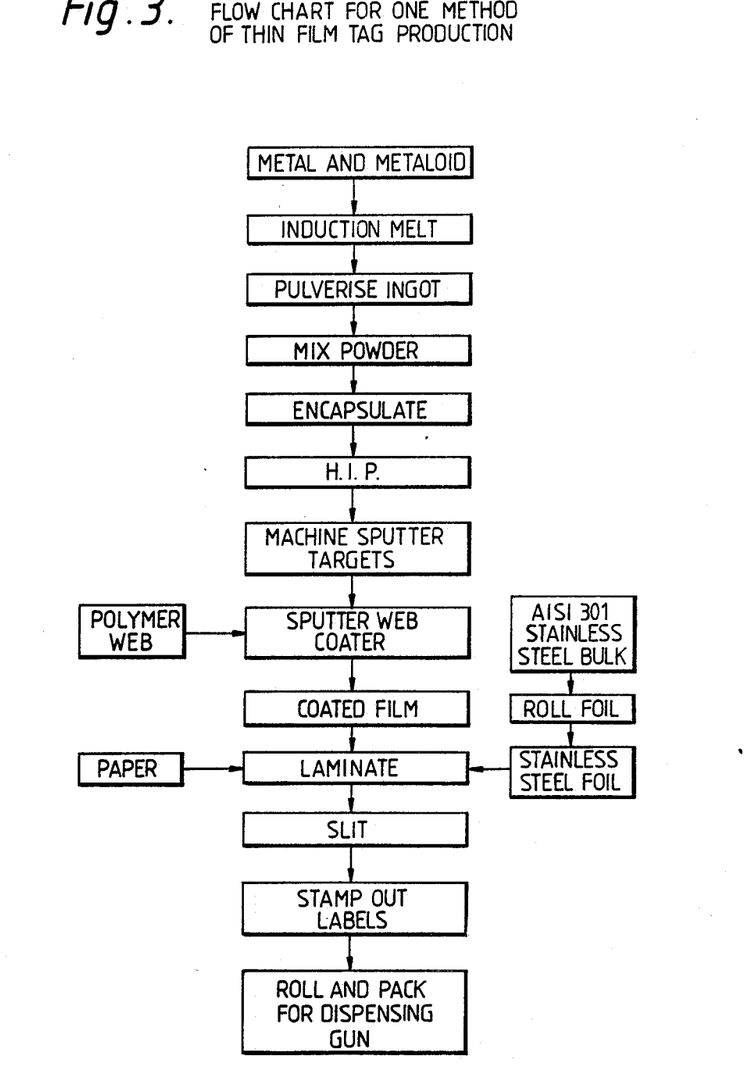
FIG. 3 is a schematic flow diagram illustrating one technique for producing a tag as illustrated in FIGS. 1 and 2.

The flow sheet of FIG. 3 is largely self-explanatory; further details of individual process steps are given in the following Examples:

EXAMPLE 1

This example describes the production of a thin film tag consisting of two magnetic components, the sensor and the deactivator. The sensor is made by sputtering a layer of amorphous metal glass onto a polymer film, and the deactivator is constructed from thin foil of stainless steel.

Sputtering is a physical vapour deposition process, carried out in a vacuum chamber, in which ions of gas, usually argon, are accelerated across a potential difference with sufficient force to eject atoms from a target. The ejected atoms travel through the partial vacuum until they collide with a surface on which they can condense forming a coating. In this example, the target was an alloy capable of forming an amorphous metal glass and consisting of cobalt (66 atom %), iron (4 atom %) molybdenum (2 atom %), silicon (16 atom %) and boron (12 atom %). The targets were manufactured by hot isostatic pressing (HIPing). With this technique, an initial ingot was made from the elements by induction melting under vacuum. The ingot was pulverised to yield a powder with maximum particle size 0.5 mm diameter. The powder was then thoroughly mixed to ensure even distribution of elements. Next, stainless steel 'cans' were manufactured to contain the powder during the HIPing process. The cans were formed from a steel block containing a trough to hold the powder, dimensions being determined by the planar magnetron used for sputtering, the trough being the width of the magnetron's 'race track'. The ends of the trough were closed off with stainless steel blocks and it was then filled with the powdered alloy. The surface was covered with a thin stainless steel sheet and sealed under a vacuum of $5 \times 10^{31\ 4}$ torr using electron beam welding.

The HIP process was carried out at 1000° C.±10° C. and 103 MPa for 120 minutes; this resulted in 100% consolidation of the powder to a crystalline block with uniform distribution of the elements.

Finally the cans were machined to expose the consolidated powder. The stainless steel surround was then shaped to form a backing plate for the target and also a side support for clamping to the magnetron. A number of target tiles manufactured in this way can be butted together to fit any size of magnetron.

The sensor layer was manufactured by sputtering a layer of the amorphous alloy one micron thick onto a continuous web of the polymer 'Upilex' (a cast polyimide manufactured by ICI and resistant to heat up to a temperature of 250° C.). Sputtering took place using a low base pressure of around $10^{-6}$ torr and a purified argon gas supply. A low sputtering pressure of around 0.5 Pascals yielded a compact film which, in the finished article, gave a high signal in the security gate.

The next production stage involves laminating the coated web to the deactivator and, on its opposite face, to a tag carrier or paper stock.

The deactivator consisted of a thin sheet (between 10 microns and 20 microns) of fully work-hardened Type AISI 301 stainless steel, a semi-hard ferromagnetic material which has the required magnetic properties of coercive force and hysteresis loop shape. This sheet was obtained by rolling from a thicker sheet to a suitable thickness of about 10 microns and a width roughly equal to that of the coated web. This deactivator sheet was then laminated onto the coated web together with a paper face sheet, an adhesive coating to attach the tag to the protected goods, and a non-adhesive backing paper to protect the adhesive before attachment. Lamination of the paper, coated polymer web, and deactivator was accomplished by use of an emulsion glue or a heated thermoplastic glue.

The completed lamination was then slit into long strips or reels of appropriate width using rotary slitting blades: at this stage, anti-tamper slits were added along the edges of the strips. The long strips may then be cut into individual tags of desired length (e.g. 23 mm by 30 mm) by die-cutting, or an incomplete die cut may be carried out to cut up the complete laminate except for the backing paper or carrier, thus allowing the tags to be transported in long reels or strips and peeled off individually from the carrier strip at the point of application to the goods to be protected.

EXAMPLE 2

The procedure of Example 1 was repeated except that the sputter target was produced by investment or "lost wax" casting instead of by HIPing.

EXAMPLE 3

The procedure of Example 1 was repeated, except that the sputter target was an alloy capable of forming an amorphous metal glass and consisting of cobalt (42 atom %), iron (5 atom %), nickel (26.7 atom %), silicon (16.6 atom %) and boron (9.7 atom %). This has the advantage that this alloy or cast is less brittle in the crystalline form, but also has the disadvantage that (in comparison with the product of Example 1), the signal level in an interrogation gate is reduced because of reduction in the saturation magnetisation of the alloy.

EXAMPLE 4

The procedure of Example 3 was repeated except that, in the sputtering operation, krypton was substituted for argon as the sputtering gas. This generated a denser film of amorphous metal glass as compared to the procedure of Example 3, and in consequence the finished tags generated a higher signal in a given interrogating field.

EXAMPLE 5

The procedure of Example 1 was repeated except that the continuous web substrate used was "O"-grade "Melinex".

EXAMPLE 6

The procedure of Example 1 was repeated except that, after the sputtering process and before lamination of the coated web to the deactivator, the web carrying the amorphous metal glass was subjected to post-annealing at 250° C. for two hours. This generated, at the end of the process, a tag which gave an increased signal as compared to the tag of Example 1 in a given interrogation field.

EXAMPLE 7

The procedure of Example 1 was repeated except that, in place of a thin sheet deactivator, different configurations of deactivating material were used. The configurations were: (a) segments of foil of circular form and approximately 7 mm in diameter; (b) strips of foil 1 mm wide and spaced apart by 1.5 mm; (c) a ferrite slurry, the ferrite having the formula $[Co_{0.2}Fe^{2+}{}_{0.8}Fe^{3+}{}_{2}O_{4}]$; (d) needles 4 mm in length and 8 microns in diameter; (e) steel wool in the form of a random array of fibres of lengths in the range 1 mm–5 mm and 8 microns in diameter; and (f) steel mesh in the form of a regular grid of steel fibres 8 microns in diameter. In each of these configurations except configuration (c), Type AISI 301 steel was used which had been cold worked to a reduction of 50%. With each of these six configurations, the tag produced at the end of the process worked well and gave a high signal in a given interrogating field. Also, after a conventional deactivation step, the tags showed no evidence of re-activation in the presence of the interrogating field.

The antipilferage steps produced in accordance with the preceding Examples all showed substantially no orientation dependence, being selected by a given interrogation field and triggering a warning signal substantially independent of the orientation of the tag with respect to the gate generating the interrogating field.

We claim:

1. An antipilferage tag or marker comprising a substrate and a thin coating of a magnetic material,
    (a) said substrate being a flexible, laminar material generally circular in shape;
    (b) said magnetic material being an amorphous metal glass of high intrinic magnetic permeability, with low or substantially zero magnetostriction, and with low coercivity; and
    (c) said thin coating of a magnetic material being no greater than 6 microns in thickness.

2. An article as claimed in claim 1, wherein the said thin coating of a magnetic material is coterminous with said substrate.

3. An article as claimed in claim 1, wherein said thin coating of a magnetic material covers substantially all of the substrate.

4. An article as claimed in claim 1, wherein said thin coating of a magnetic material is substantially uniform in thickness.

5. An article as claimed in claim 1, wherein said thin coating of a magnetic material is in the form of a lattice.

6. An article as claimed in claim 1, wherein said thin coating of a magnetic material has been bonded directly to, or deposited upon, said substrate.

7. An article as claimed in any claim 1, wherein said thin coating of a magnetic material has been bonded to, or deposited upon, an intermediate layer which itself has been deposited on said substrate.

8. An article as claimed in claim 7, wherein said intermediate layer is a thin metal film.

9. An article as claimed in claim 8, wherein said metal film is an aluminum film.

10. An article as claimed in claim 1, wherein said substrate is formed of a polyamide or a polyimide.

11. An article as claimed in claim 1, wherein said substrate is formed of a polyester.

12. An article as claimed in claim 11, wherein substrate is formed of polyethylene terephthalate.

13. An article as claimed in claim 1, wherein said thin coating is a broken or discontinuous flat loop of ferromagnetic material.

14. An article as claimed in claim 13, wherein said thin coating is a circular annulus.

15. An article as claimed in claim 1, wherein said thin coating substantially magnetically isotropic in the plane of the substrate.

16. An article as claimed in claim 1, wherein said amorphous metal glass is an alloy containing cobalt and niobium together with a glass-forming element.

17. An article as claimed in claim 1, wherein said amorphous metal glass is an alloy containing cobalt, iron, silicon and boron.

18. An article as claimed in claim 17, wherein said alloy further contains nickel.

19. An article as claimed in claim 17, wherein the atomic ratio Co:Fe is in the range 8:1 to 20:1.

20. An article as claimed in claim 19, wherein the atomic ratio Co:Fe is about 16:1.

21. An article as claimed in claim 1, wherein said amorphous metal glass is an alloy of the formula: $Co_a Fe_b Ni_c Mo_d Si_e B_f$, where a is in the range of 35 to 70 atomic percent, b zero to 8 atomic percent, c zero to 40 atomic percent, d zero to four atomic percent, e zero to thirty atomic percent and f zero to thirty atomic percent, with at least one of groups b, c, d, e, and f being non zero.

22. An article as claimed in claim 21, wherein said amorphous metal glass is an alloy having a composition (in atomic percent) in the range: Co, 35–70; Fe, 2–7; Ni 10–35; Mo, 0–2; Si, 12–20; and B, 6–12.

23. An article as claimed in claim 22, wherein said alloy has the composition (in atomic %): Co,42; Fe,4; Ni,28; Si,16; B,9.

24. An antipilferage tag or marker in the form of a substrate and a thin coating of a magnetic material,:
(a) said substrate being a flexible, laminar material;
(b) said magnetic material being an amorphous metal glass of high intrinsic magnetic permeability and with low or substantially zero magnetostriction; and
(c) said thin coating of a magnetic material being no greater than 6 microns in thickness. wherein said tag or marker further comprises a deactivation layer or zone(s) adjacent to or overlying said thin coating.

25. An article as claimed in claim 24, wherein said deactivation layer is a continuous sheet overlying said thin coating.

26. An article as claimed in claim 24, wherein said deactivation zone(s) comprise a multiplicity of discrete elements.

27. An article as claimed in claim 24, wherein the material constituting said deactivation layer or zone(s) comprises a mild steel foil.

28. An article as claimed in claim 24, wherein the material constituting said deactivation layer or zone(s) is formed of a cold worked Type AISI 301 stainless steel.

29. An article as claimed in claim 24, wherein a thick film ferrite is the deactivating material.

30. An article as claimed in claim 29, wherein said ferrite has the formula ($[Co_{0.2}Fe^{2+}_{0.8}Fe^{3+}_2O_4]$).

31. An article as claimed in claim 24, wherein a semi-hard ferromagnetic material in the form of needles, steelwool fibers or a grid is the deactivating material.

32. An article as claimed in claim 2, wherein said thin coating is a coating that has been deposited onto said substrate by a physical vapour deposition process.

33. An article as claimed in claim 1, wherein said thin coating is from 1 to 5 microns in thickness.

34. An antipilferage tag or marker comprising a substrate and a thin coating of a magnetic material,
(a) said substrate being a flexible, laminar material;
(b) said magnetic material being an amorphous metal glass of high intrinsic magnetic permeability, with low or substantially zero magnetostriction, and with low coercivity, and
(c) said thin coating of a magnetic material being no greater than 6 microns in thickness,
(i) said substrate has a primary axis defining the major dimension of the substrate and a real or notional secondary axis perpendicular to said primary axis and located so as to pass through the mid point of said primary axis; and
(ii) the ratio between the dimensions of said substrate measured along said primary axis and said secondary axis is not greater than 3:1.

35. An article as claimed in claim 34, wherein the ratio between the dimensions of said primary and secondary axes is in the range of 1:1 to 3:1.

36. An article as claimed in claim 34, wherein the primary axis of said substrate has a dimension in the range of 10 to 60 millimeters and the secondary axis of said substrate has a dimension in the range of 4 to 45 millimeters.

37. An article as claimed in claim 34, wherein the article is generally rectangular in shape.

38. An article as claimed in claim 34, wherein the article is generally square in shape.

39. An antipilferage tag or marker which comprises a deactivating layer of region comprising a stainless steel which has been cold worked substantially to a hardened state, said steel being an alloy containing, in atomic %, 15–20% chromium; 5–10% nickel; carbon up to 0.15%; and the balance iron together with incidental impurities present up to a total of 4%.

40. An antipilferage tag or marker as claimed in claim 39, which contains (in atomic %) 0.5–3% manganese and 0.5–1.5% silicon.

41. An antipilferage tag or marker, which comprises a substrate that includes a plurality of acicular elements of magnetic material on said substrate.

42. A tag or marker as claimed in claim 41, wherein said acicular elements are fine needle-shaped particles of magnetically non-linear material incorporated into paper or into a film.

43. A tag or marker as claimed in claim 41, wherein said acicular elements are about 200 microns long.

44. An antipilferage tag or marker which comprises a substrate, and a broken or discontinuous flat loop of ferromagnetic material carried by said substrate.

45. A tag or marker as claimed in claim 44, wherein said flat loop of ferromagnetic material is in the form of a circular annulus of magnetically non-linear ferromagnetic material.

46. An article for use as an antipilferage marker, comprising: an active component of soft magnetic material for generating a signal in an interrogation field applied by a detection system for detecting the article; and means for deactivating the active component so that said signal is not generated, or is generated only below a level detectable by the detection system, said deactivating means comprising a plurality of ferromagnetic elements carried by the active component, and each ferromagnetic element acquiring, in the presence of a deactivating magnetic field, north and south magnetic poles at opposite end regions thereof and the ferromagnetic elements being randomly oriented over the surface of the article.

47. An article as claimed in claim 46, in which the ferromagnetic elements comprise steel wool fibres.

48. An article as claimed in claim 46, in which the ferromagnetic elements comprise ferrite particles.

49. An article for use as an antipilferage marker, comprising: an active component of soft magnetic material for generating a signal in an interrogation field applied by a detection system for detecting the article; and means for deactivating the active component so that said signal is not generated, or is generated only below a level detectable by the detection system, said deactivating means comprising a layer of mild steel secured to the active component.

50. An antipilferage tag which comprises a substrate and a thin coating of a magnetic material,:
    (a) said substrate being a flexible, laminar polymer material;
    (b) said magnetic material being an amorphous metal glass of high intrinsic magnetic permeability, with low or substantially zero magnetostriction, and with low coercivity;
    (c) said thin coating of a magnetic material being no greater than 6 microns in thickness;
    (d) said substrate having a primary axis defining the major dimension of the substrate and a real or notional secondary axis perpendicular to said primary axis and located so as to pass through the mid point of said primary axis;
    (e) the ratio between the dimensions of said substrate measured along said primary axis and said secondary axis being no greater than 3:1; and
    (f) the tag further including a deactivation layer of zone(s) adjacent to said thin coating.

51. A tag as claimed in claim 50, wherein said amorphous metal glass is an alloy of the formula: $Co_a Fe_b Ni_c Mo_d Si_e B_f$, where a is in the range of 35 to 70 atomic percent, b zero to 8 atomic percent, c zero to 40 atomic percent, d zero to four atomic percent, e zero to thirty atomic percent and f zero to thirty atomic percent, with at least one of groups b, c, d and e, f being non zero.

52. A tag as claimed in claim 51, wherein said amorphous metal glass is an alloy having a composition (in atomic percent) in the range: Co, 35–70; Fe, 2–7; Ni 10–35; Mo, 0–2; Si, 12–20; and B, 6–12.

53. An antipilferage tag or marker comprising a substrate and a thin coating of a magnetic material,
    a. said substrate being a flexible, laminar material formed of a polyester;
    b. said magnetic material being an amorphous metal glass of high intrinsic magnetic permeability, with low or substantially zero magnetostriction, and with low coercivity; and
    c. said thin coating of a magnetic material being no greater than 6 microns in thickness.

54. An antipilferage tag or marker comprising a substrate and a thin coating of a magnetic material,
    a. said substrate being a flexible, laminar material;
    b. said magnetic material being an amorphous metal glass of high intrinsic magnetic permeability, with low or substantially zero magnetostriction, and with low coercivity; and
    c. said thin coating of a magnetic material being no greater than 6 microns in thickness, and being configured as a broken or discontinuous flat loop of ferromagnetic material.

55. An antipilferage tag or marker comprising a substrate and a thin coating of a magnetic material,
    (a) said substrate being a flexible, laminar material;
    (b) said magnetic material being an amorphous metal glass of high intrinsic magnetic permeability, with low or substantially zero magnetostriction, and with low coercivity; and
    (c) said thin coating of a magnetic material being no greater than 6 microns in thickness, and being substantially magnetically isotropic in the plane of the substrate.

56. An antipilferage tag or marker comprising a substrate and a thin coating of a magnetic material,
    (a) said substrate being a flexible, laminar material;
    (b) said magnetic material being an amorphous metal glass of high intrinsic magnetic permeability, with low or substantially zero magnetostriction, and with low coercivity, and being formed from an alloy containing cobalt and niobium together with a glass-forming element, and
    (c) said thin coating of a magnetic material being no greater than 6 microns in thickness.

57. An antipilferage tag or marker comprising a substrate and thin coating of a magnetic material,
    (a) said substrate being a flexible, laminar material;
    (b) said magnetic material being an amorphous metal glass of high intrinsic magnetic permeability, with low or substantially zero magnetostriction, and with low coercivity and including an alloy containing cobalt, iron, silicon and boron; and
    (c) said thin coating of a magnetic material being no greater than 6 microns in thickness.

* * * * *